United States Patent
Okada

(10) Patent No.: US 6,305,709 B1
(45) Date of Patent: Oct. 23, 2001

(54) AIRBAG UNIT

(75) Inventor: Takeo Okada, Saitama (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/265,580

(22) Filed: Mar. 10, 1999

(30) Foreign Application Priority Data

Mar. 12, 1998 (JP) .................................................. 10-061771

(51) Int. Cl.$^7$ .................................................. B60R 21/32
(52) U.S. Cl. .............................................. 280/735; 701/45
(58) Field of Search ................................ 280/735; 701/45

(56) References Cited

U.S. PATENT DOCUMENTS

| | | | |
|---|---|---|---|
| 5,508,920 | * | 4/1996 | Gioutsos et al. ................ 364/424.05 |
| 5,519,613 | * | 5/1996 | Gioutsos et al. ................ 364/424.05 |
| 5,521,822 | * | 5/1996 | Wang ................................ 364/424.05 |
| 5,546,307 | * | 8/1996 | Mazur et al. .................... 364/424.05 |
| 5,559,697 | * | 9/1996 | Wang ................................ 364/424.05 |
| 5,587,906 | * | 12/1996 | Mciver et al. ................. 364/424.045 |
| 5,608,628 | * | 3/1997 | Drexler et al. ................ 364/424.055 |
| 5,609,358 | * | 3/1997 | Iyoda et al. ........................... 280/735 |
| 5,631,834 | * | 5/1997 | Tsurushima et al. ......... 364/424.055 |
| 5,668,720 | * | 9/1997 | Takahashi et al. ..................... 701/46 |
| 5,702,124 | * | 12/1997 | Foo et al. .............................. 280/735 |
| 5,705,077 | * | 1/1998 | Yokota et al. ........................ 280/735 |
| 5,758,301 | * | 5/1998 | Saito et al. ............................. 701/45 |
| 5,787,377 | * | 7/1998 | Watanabe et al. ....................... 701/45 |
| 5,815,393 | * | 9/1998 | Chae .............................. 364/424.056 |
| 5,892,435 | * | 4/1999 | Buchheim et al. .................... 340/438 |
| 5,967,548 | * | 10/1999 | Kozyreff ............................... 280/735 |
| 5,969,599 | * | 10/1999 | Wessels et al. ....................... 340/436 |
| 5,983,148 | * | 11/1999 | Bigi et al. .............................. 701/45 |
| 5,997,033 | * | 12/1999 | Gray et al. ............................ 280/735 |
| 5,999,871 | * | 12/1999 | Liu .......................................... 701/45 |
| 6,005,479 | * | 12/1999 | Ide ........................................ 340/438 |
| 6,036,225 | * | 3/2000 | Foo et al. .............................. 280/735 |
| 6,095,554 | * | 8/2000 | Foo et al. .............................. 280/735 |

* cited by examiner

*Primary Examiner*—Eric Culbreth
*Assistant Examiner*—L. Lum
(74) *Attorney, Agent, or Firm*—Rothwell, Figg, Ernst & Manbeck

(57) ABSTRACT

An airbag unit comprising: an acceleration sensor for detecting an acceleration applied to a vehicle; an acceleration-to-speed converting means for inputting an acceleration signal fed from the acceleration sensor and converting it to a speed signal; a crash state judging means for judging the type of crash on the basis of the speed signal fed from the acceleration-to-speed converting means; a first and second threshold generating means each for selecting and outputting a threshold depending on the crash type; a first comparing means for comparing the threshold from the first threshold generating means and the acceleration signal, and outputting a first crash signal; a second comparing means for comparing the threshold from the second threshold generating means and the speed signal, and outputting a second crash signal; and an activation control means for comparing the first crash signal and the second crash signal and output an inflation signal.

13 Claims, 6 Drawing Sheets

1st & 3rd THRESHOLDS
(TH/L-1, L-3)

AIRBAG UNIT

BACKGROUND OF THE INVENTION

1. Field of the Invention

The present invention relates to an airbag unit for protecting people in an automotive vehicle from a lateral-side crashing accident, and more particularly to an airbag unit which is capable of coping with a frontal crashing phenomenon as well as the lateral-side crashing accident, together with a method of inflating the airbag unit provided therein.

2. Description of the Related Art

The conventional airbag unit is a system including an anti-frontal-crash protective device whose configuration is, for example, as simple as the one shown in FIG. 7, so that a so-called anti-frontal-crash protective device (hereinafter may be referred to just as a front-side airbag unit) is first explained here in order to facilitate the understanding about an airbag unit as a whole.

Within the configuration shown in FIG. 7, an electric voltage output from a vehicle mounting type battery 1 is supplied, by way of an ignition switch 2, to a step-up transformer circuit 3, and a back-up capacitor 4 is charged by the thus enhanced output voltage. Thereafter, when a microcomputer 9 (later explained) judges that there has been a serious crash on the basis of an acceleration signal fed from an acceleration sensor 8 and drives a switching circuit 5 to the on state, the electric charge generated at back-up capacitor 4 is discharged by way of a squib 6 and a mechanical acceleration switch 7 (in the on state here, although it is normally in the off state) which are serially connected, and the powder (not shown) is thus exploded by the squib 6, and an airbag is thereby inflated.

However, the anti-frontal-crash protective device has been developed only for protecting the people mounted in a vehicle from a crashing accident caused at the vehicle front portion, whereby in order to protect the people also from a lateral-side crashing force exerted against the lateral side portions of the vehicle, there has also been provided an airbag unit having a configuration shown in FIG. 8 wherein some circuits are commonly used.

Namely, as shown in FIG. 8, the unit denoted by reference numeral 10 is a front-side airbag unit for protecting the people inside the vehicle from a crash caused at the vehicle front portion, the detailed explanation about which is omitted here as the configuration thereof is identical with the one shown in FIG. 7. The unit denoted by reference numeral 11 is a lateral-side airbag unit for driver's seat (hereinafter may be referred to just as a driver's seat airbag unit) arranged for protecting the driver from a crash caused at the lateral side portion, wherein the electric power for this driver's seat airbag unit 11 is supplied by being connected with the back-up capacitor 4 for the above-explained anti-frontal-crash protective device 10 by way of a power line 13 such as a harness or the like through the terminal A. On the other hand, the unit denoted by reference numeral 12 is a lateral-side airbag unit for assistant driver's seat (hereinafter may be referred to just as an assistant driver's seat airbag unit), and the configuration thereof is totally same as that of the driver's seat airbag unit 11.

Reference numeral 20 denotes a microcomputer having the similar function as that of the microcomputer 9, which receives an acceleration signal generated in the lateral direction of the driver's seat and fed from a lateral-direction acceleration sensor 19 (hereinafter abbreviated to a lateral acceleration sensor). When the microcomputer 20 judges that the detected crash is a serious one, it sets a switching circuit 21 to the on state. It should be noted that reference numeral 17 denotes a squib same as the squib 6, reference numeral 18 denotes a mechanically activated acceleration switch same as the switch 7, and reference numeral 15 denotes a constant voltage circuit, which receives an output voltage from the before-mentioned back-up capacitor 4 by way of the power line 13, and provides constant voltage to each of the circuits configuring the driver's seat airbag unit 11.

By the way, the assistant driver's seat airbag unit denoted by reference numeral 12 in FIG. 8 is connected in parallel with the driver's seat airbag unit 11 which is further connected with the terminal A of the before-explained anti-frontal-crash protective device 10. The assistant driver's seat airbag unit 12 is connected with the before-explained anti-frontal-crash protective device 10 by way of a power line 14 through an output terminal A'.

Since the anti-frontal-crash protective device 10 operates just like the one shown in FIG. 7, the detailed explanation thereabout is therefore omitted here. The driver's seat airbag unit 11 receives the enhanced voltage fed from the step-up transformer circuit 3 of the protective device 10 by way of the power line 13 through the output terminal A, and the lateral acceleration sensor 19 thereof detects an acceleration signal generated in response to a lateral crashing force exerted to the driver's seat door. When the microcomputer 20 judges that the crash has been a serious one due to the thus detected signal, it sets the switching circuit 16 to on, so that it sends the electric power, which is charged at the back-up capacitor 4 of the anti-frontal-crash protective device 10 and provided by way of the power line 13, to the squib 17 and the mechanically activated acceleration switch 18 serially, so as to explode powder (not shown) and inflate the airbag.

Further, the assistant driver's seat airbag unit 12 is configured in the substantially same manner as that of the driver's seat airbag unit 11, and just like the driver's seat airbag unit 11, it not only receives the enhanced voltage from the step-up transformer circuit 3 of the anti-frontal-crash protective device 10 by way of the power line 14 through the output terminal A', but the lateral acceleration sensor thereof also detects an acceleration signal generated in response to a lateral crashing force exerted to the assistant driver's seat door. When the microcomputer judges that the crash has been a serious one due to the thus detected signal, it sets the switching circuit to on, so that it sends the electric power, which is charged by the back up capacitor 4 of the anti-frontal-crash protective device 10, to the squib and the acceleration switch serially, thereby to explode powder and inflate the airbag.

However, since each of the airbag units as shown in FIG. 8 is provided with an acceleration sensor, the system size as a whole is made too large, causing thereby a rise of total cost.

Further, in consideration of a precise signal detection, when an acceleration signal generated at the moment of a crash does not abruptly vary; namely the case of an intermediate-speed crash, as is shown in each of the cases of offset crashing, center-pole crashing, right-oblique crashing, left-oblique crashing and so on all possibly caused in the case of a frontal crash, a threshold level which is different from that for a normal high-speed crash should be set. Similarly, in the case of a lateral side crash, considering the case in which acceleration signals are detected by a sensor at a position close to the longitudinal center axis of a vehicle, the acceleration signal generated at the moment of crashing is not likely to be transmitted directly to the sensor. In other words, when an acceleration signal is generated by a lateral crashing force exerted to the side door panel, the crashing energy is converted from an initial destruction force against the vertical surface of the panel to a horizontal bending force, so that the acceleration thereof finally transmitted to the sensor can be defined more likely as the intermediate-speed crash observed in the case of the frontal crash. Therefore, if the threshold for judging the level of danger is set to only one level for all kinds of crash, the magnitude of acceleration cannot be properly detected.

SUMMARY OF THE INVENTION

The present invention is made to solve the problem aforementioned, and it is an object of the present invention to provide an airbag unit in which one acceleration sensor for detecting an acceleration caused by a laterally applied crashing force is commonly used, yet a high detection accuracy is obtained thereby.

Still further, it is another object of the present invention to provide an airbag unit which is, for obtaining a practical high detection accuracy in performing a common use of only one acceleration sensor, capable of providing proper threshold levels for all kinds of crash, by locating the acceleration sensor at a proper position.

Yet still further, it is also an object of the present invention to provide an airbag unit capable of identifying an intermediate-speed crash and a rough road travelling state, which is quite difficult in a normal procedure.

In order to realize the above object, an airbag unit according to the first aspect of the present invention is constructed such that it comprises: an acceleration sensor for detecting an acceleration applied to a vehicle; an acceleration-to-speed converting means for inputting an acceleration signal fed from the acceleration sensor and converting it to a speed signal; a crash state judging means for judging the type of crash on the basis of the speed signal fed from the acceleration-to-speed converting means; a first and second threshold generating means respectively for selecting and outputting a threshold mode on the basis of the crash state judging means wherein the set level of the threshold varies in accordance with time lapse; a first comparing means for comparing the threshold from the first threshold generating means and an acceleration signal fed from the acceleration sensor, and outputting a first crash signal when the acceleration signal exceeds the threshold; a second comparing means for comparing the threshold from the second threshold generating means and a speed signal fed from the acceleration-to-speed converting means, and outputting a second crash signal when the speed signal exceeds the threshold; and an activation control means for comparing the first crash signal from the first comparing means and the second crash signal from the second comparing means, and outputting an inflation signal.

According to the second aspect of the present invention, the crash state judging means of the airbag unit judges the type of crash on the basis of the magnitude of the speed signal fed from the acceleration-to-speed converting means at a predetermined timing after the speed signal is generated.

According to the third aspect of the present invention, the crash state judging means of the airbag unit judges the type of crash on the basis of the magnitude of the speed signal fed from the acceleration-to-speed converting means at predetermined first and second timings after the speed signal is generated.

According to the fourth aspect of the present invention, the crash state judging means of the airbag judges a high-speed crash on the basis of the magnitude of the speed signal at the first timing, and also judges an intermediate-speed crash state and a rough road travelling state on the basis of the magnitude of the speed signal at the second timing.

According to the fifth aspect of the present invention, the threshold output from the first threshold generating means of the airbag unit is set to a mode in which the threshold is lowered in accordance with the output from the crash state judging means at the timing after a predetermined time from the output of the threshold.

According to the sixth aspect of the present invention, the threshold output from the second threshold generating means of the airbag unit is set to a mode in which the threshold is lowered in accordance with the output from the crash state judging means during the time period beginning from a predetermined time after the output of the threshold.

According to the seventh aspect of the present invention, the threshold output from the second threshold generating means of the airbag unit is set to a mode in which the threshold is maintained in the same level for a predetermined time period after the output of the threshold, and raised thereafter in accordance with the output from the crash state judging means.

According to the eighth aspect of the present invention, the acceleration sensor is mounted to a vehicle chassis under the center console of the vehicle, and According to the ninth aspect of the present invention, a method of inflating an airbag by use of an airbag unit for protecting people in a vehicle from a lateral crash exerted to the vehicle comprises the steps of: inputting an acceleration signal from an acceleration sensor for detecting an acceleration applied to a vehicle, and converting an acceleration signal fed from the acceleration sensor to a speed signal by an acceleration-to-speed converting means; judging the type of crash on the basis of the converted speed signal by a crash state judging means; selecting a threshold on the basis of the judged crash state, and outputting to respective first to fourth threshold generating means, wherein the set level of the threshold varies in accordance with time lapse; wherein when the speed signal is in one of the positive and negative sides, comparing the threshold from the first threshold generating means and an acceleration signal fed from the acceleration sensor by use of a first comparing means, and outputting a first crash signal when the acceleration signal exceeds the threshold; comparing the threshold from the second threshold generating means and a speed signal fed from the acceleration-to-speed converting means sensor by use of a second comparing means, and outputting a second crash signal when the speed signal exceeds the threshold; and outputting an inflation signal when the first crash signal from the first comparing means and the second crash signal from the second comparing means are both output, and wherein when the speed signal is in the other one of the positive and negative sides, comparing the threshold from the third threshold generating means and an acceleration signal fed from the acceleration sensor by use of a third comparing means, and outputting a third crash signal when the acceleration signal exceeds the threshold; comparing the threshold from the fourth threshold generating means and a speed signal fed from the acceleration-to-speed converting means by use of a fourth comparing means, and outputting a fourth crash signal when the speed signal exceeds the threshold; and outputting an inflation signal in the case that the third crash signal from the third comparing means and the fourth crash signal from the fourth comparing means are both output.

DETAILED DESCRIPTION OF THE PREFERRED EMBODIMENTS

[First Embodiment]

Figure 1:
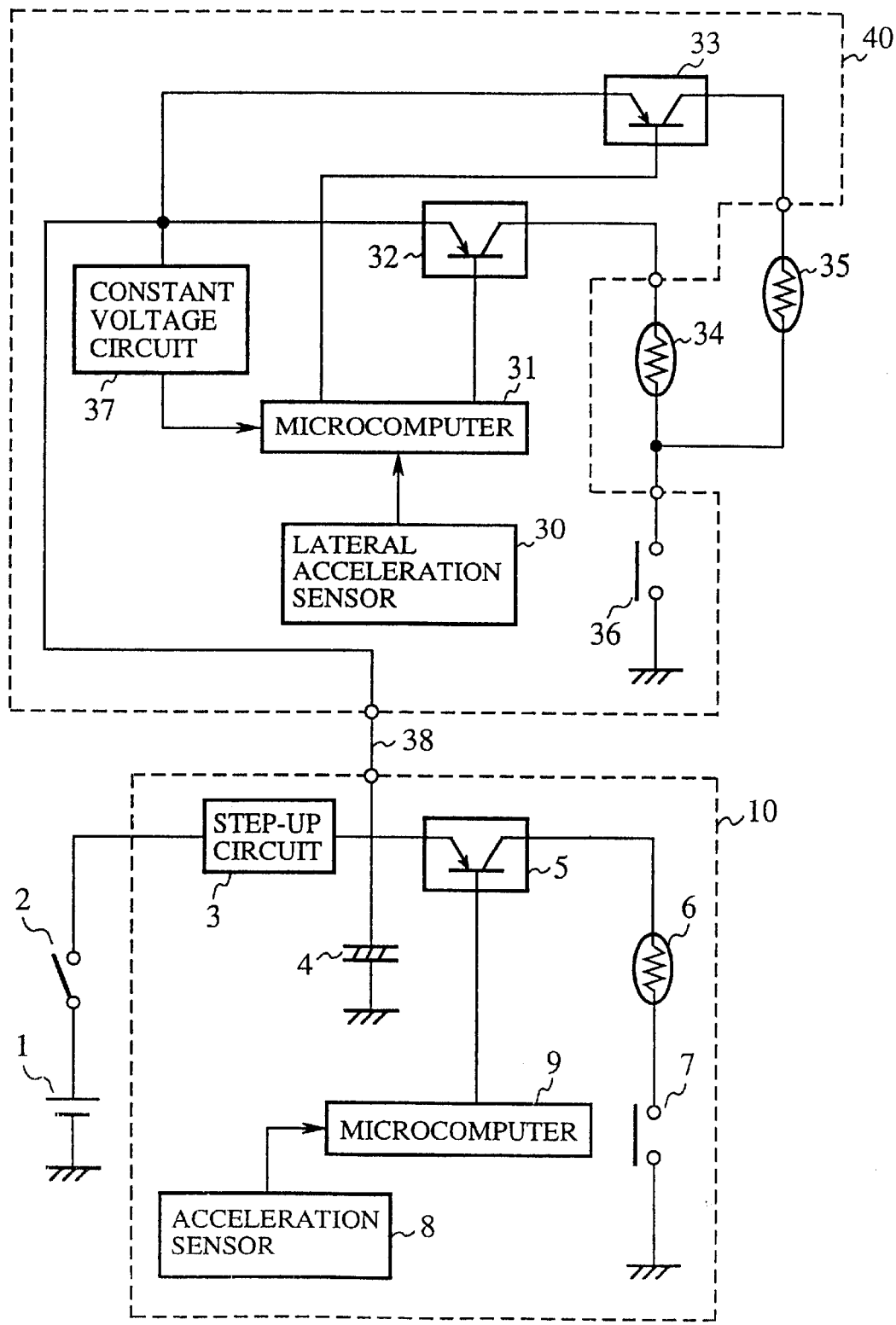
FIG. 1 is a schematic view illustrating a general construction of a first embodiment of the present invention.

An anti-lateral-crash airbag unit according to the first embodiment of the present invention (hereinafter referred to just as a lateral-side airbag unit) is an integrated unit of a driver's seat airbag unit and an assistant driver's seat airbag unit as shown in FIG. 1, and is set to the vehicle body chassis between the driver's seat and the assistant driver's seat, wherein the acceleration sensor thereof is attached to the chassis under the center console. The lateral-side airbag unit according to this embodiment will now be explained with reference to FIGS. 1 and 2, although a detailed explanation about the portions already explained with reference to FIG. 8 is omitted here by putting the identical reference numerals.

Figure 8:
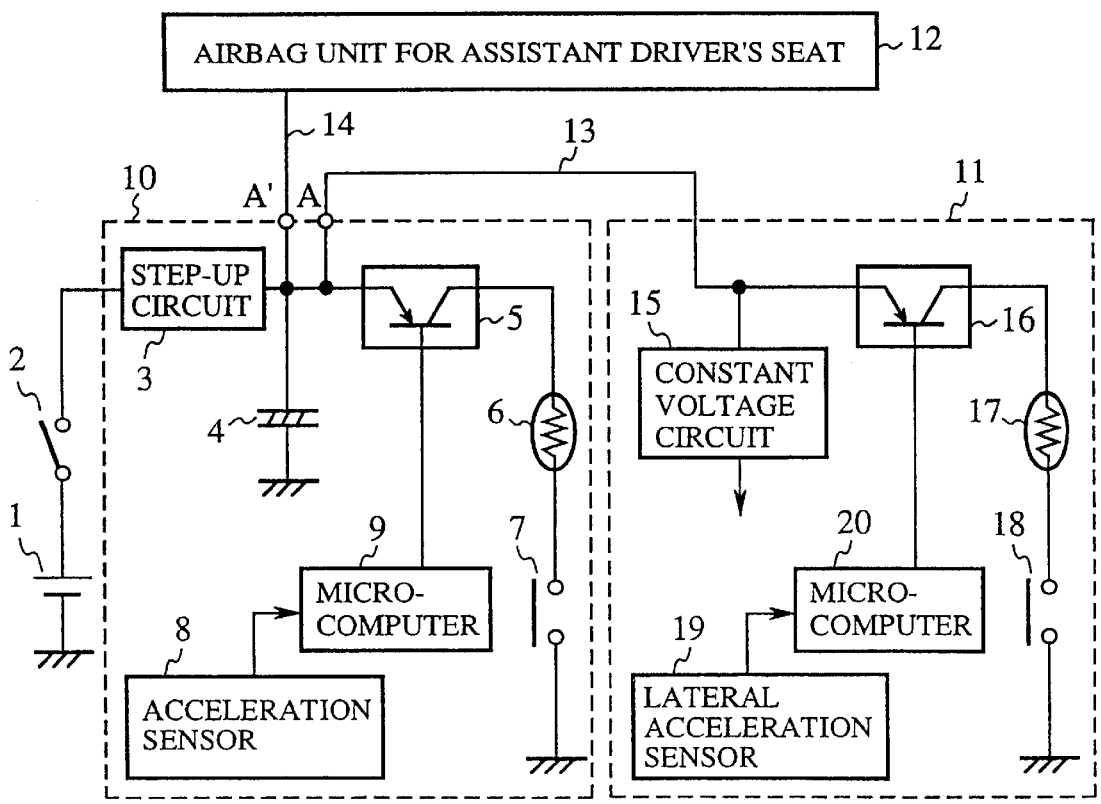
FIG. 8 is a circuit diagram for explaining a configuration of the conventional anti-lateral-crash protective device including the device of FIG. 7.

Namely, the lateral-side airbag unit 40 for both side seats, which is an integrated unit of the driver's seat airbag unit and the assistant driver's seat airbag unit, is configured by a lateral acceleration sensor 30 (substantially same as the lateral acceleration sensor 19 in FIG. 8), a microcomputer 31, a first switching circuit 32 as a right-side airbag inflation triggering circuit (same as the switching circuit 16 in FIG. 8), a second switching circuit 33 as a left-side airbag inflation triggering circuit (same as the switching circuit 16 in FIG. 8), an acceleration switch 36 (same as the switch 18 in FIG. 8), and a constant voltage circuit 37 (same as the constant voltage circuit 15 in FIG. 8).

The microcomputer 31 that receives electric power from the constant voltage circuit 37 judges the magnitude of the lateral crash and at which side the crash has occurred on the basis of an acceleration signal fed from the lateral acceleration sensor 30. On this occasion, if it judges that the crash has occurred at the right side (the driver's seat side), it sets the first switching circuit 32 to on, so as to activate the squib 34, whereas if it judges that the crash has occurred at the left side (the assistant driver's seat side), it sets the second switching circuit 33 to on, so as to activate the squib 35.

It should be noted that the lateral-side airbag unit 40 for both side seats 40 and the anti-frontal-crash protective device 10 can be accommodated in one case, may be with only one microcomputer. Further, although the acceleration switch 36 adopted in this embodiment is of a mechanically driven type, it goes without saying that this can be replaced by an electronically driven switch, which is constructed in such a manner that a comparing circuit is connected to the output from the acceleration sensor having the same construction and function as the lateral acceleration sensor shown in the figure, and a switching signal is output when the magnitude of the acceleration exceeds the reference value of the comparing circuit, whereby a switching transistor inserted between the squib 34 and the ground is set to on, and the ground side of each of the squibs 34 and 35 is grounded.

Figure 2:
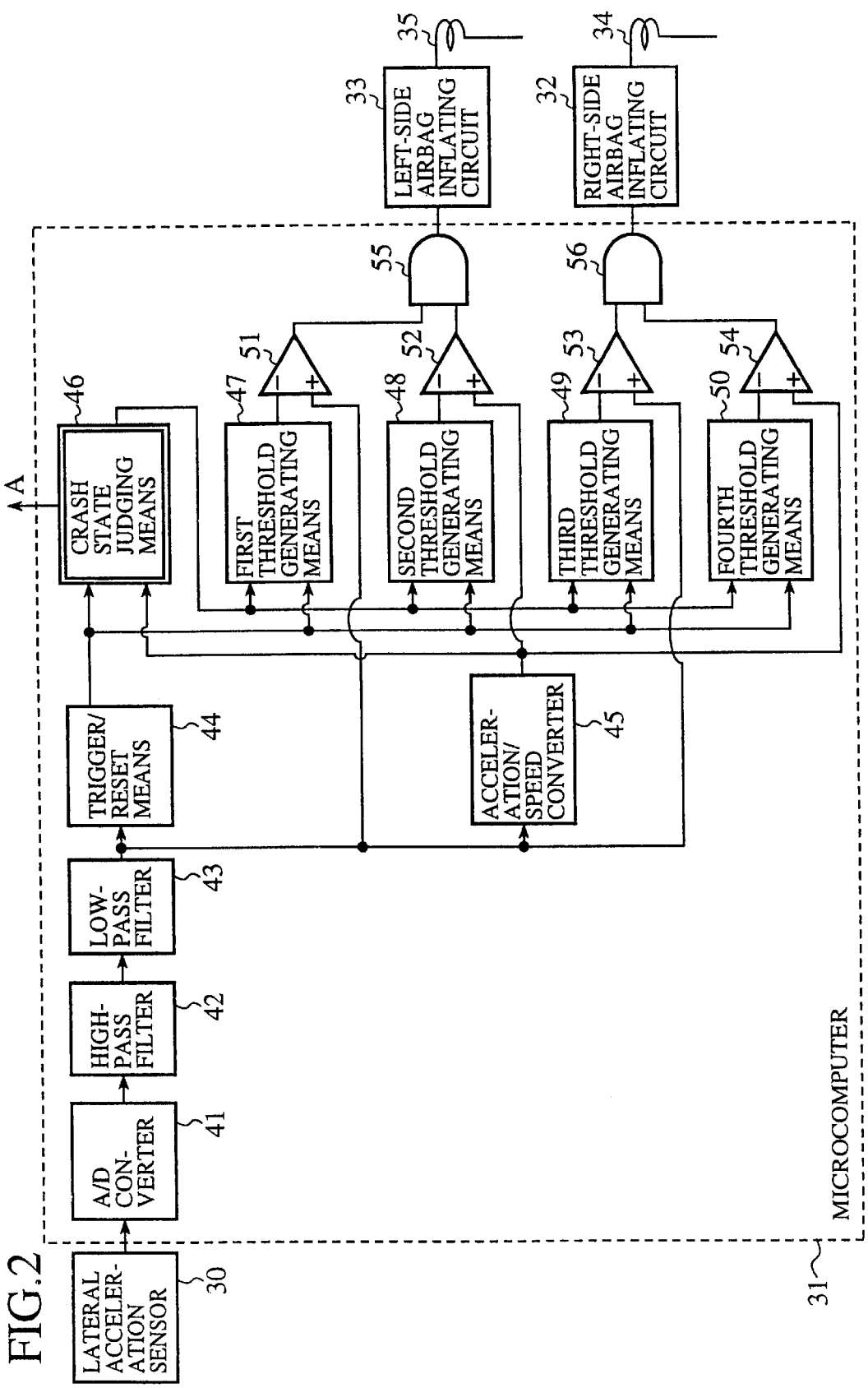
FIG. 2 is a circuit diagram in which the function of microcomputer 31 shown in FIG. 1 is divided into a plurality of function blocks.

Next, the function of the microcomputer 31 is explained with reference to FIG. 2.

The microcomputer 31 is configured by an analog-to-digital converter (or just an A/D converter) 41, a high-pass filter 42, a low-pass filter 43, a triggering/resetting means 44, an acceleration-to-velocity converter 45 (hereinafter may be referred to as acceleration/speed converter), a crash state judging means 46, first to fourth threshold generating means 47 to 50, first to fourth comparing means 51 to 54, a first AND gate 55 and a second AND gate 56.

The A/D converter 41 first inputs an acceleration signal generated due to the lateral-side crashing from the lateral acceleration sensor 30, and feeds a converted digital signal, by way of the high-pass filter 42 and the low-pass filter 43 serially, to the triggering/resetting means 44, the acceleration/speed converter 45, and to each of the first comparing means 51 and the third comparing means 53 in parallel.

When the triggering/resetting means 44 receives an acceleration signal whose magnitude exceeds a predetermined value, it sends a trigger signal to each of the first to fourth threshold generating means 47 to 50 in parallel.

The acceleration/speed converter 45 adds the acceleration signal fed from the low-pass filter 43 (which corresponds to an integration in the analog process) so as to convert it to a speed signal, and sends it thereafter to the crash state judging means 46 and to each of the second comparing means 52 and the fourth comparing means 54 in parallel.

Figure 3:
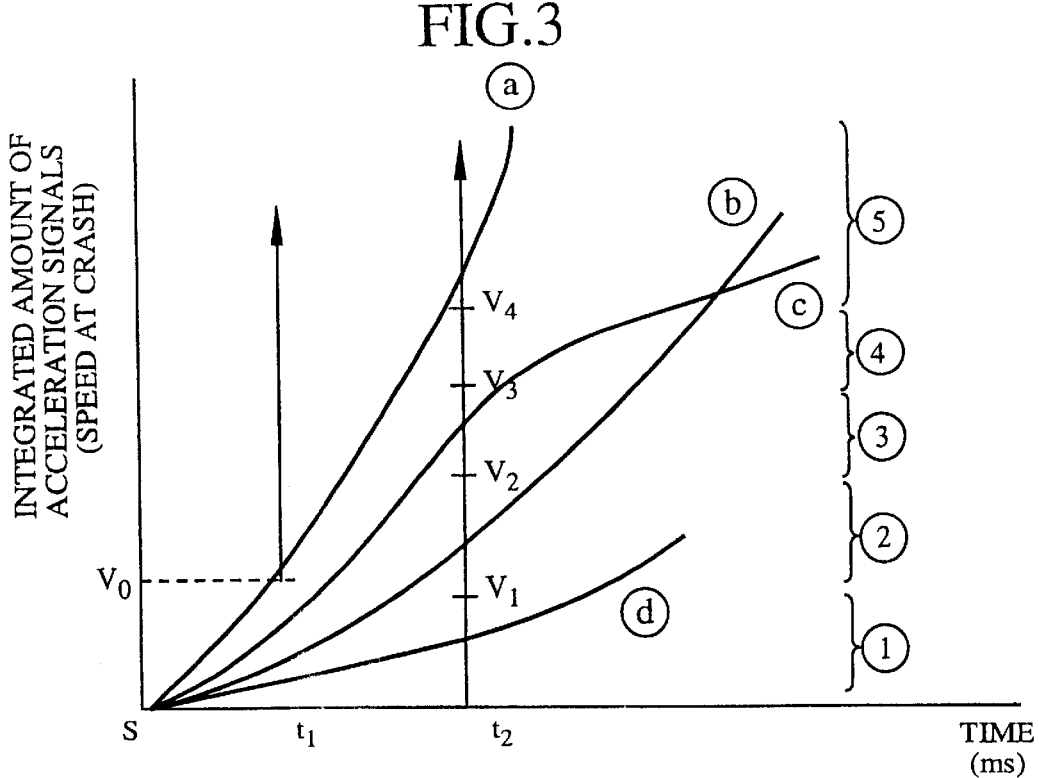
FIG. 3 is an exemplary view for explaining how the judgment is made by a crash state judging means 46.

When the crash state judging means 46 receives a trigger signal from the triggering/resetting means 44 (which is output when it is judged that the acceleration is different from the normal acceleration generated during the vehicle is travelling, and that the acceleration is generated due to a crashing accident), it receives the speed signal from the acceleration/speed converter 45, and judges as to which of the crash type the generated acceleration signal corresponds to, for example, among a high-speed crash, an intermediate-speed crash, or a rough-road travelling state on the basis of the level of the speed signal. First, at the timing t1 msec after the acceleration signal has been detected, whether or not the speed signal exceeds the speed level V0 is judged. On this occasion, if the judgment is positive, then it is judged to be a high-speed crash whose variation in accordance with the time elapse is indicated by ⓐ as shown in FIG. 3, and a signal corresponding to the result of the judgment at that time, namely a signal indicating the high-speed crash is fed to each of the first to fourth threshold generating means 47 to 50 in parallel. Conversely, if the judgment is negative, in other words, if it is judged that the speed signal has not exceeded the level V0 at the timing t1 msec (hereinafter abbreviated to t1), then it is further detected at the timing t2 msec (abbreviated to t2 hereinafter) (t1<t2) by use of the function of a window comparator (see FIG. 3) as to which of the ranges among the ranges respectively between V1 and V2, V2 and V3, V3 and V4 (②, ③ and ④ in FIG. 3), the range between 0 and V1 (①in FIG. 3), and the range higher than the level V4 (⑤ in FIG. 3), the signal is classified (V1<V2<V3<V4) in order to judge whether the acceleration signal is generated by the intermediate-speed crash (when larger than the speed level V1) or due to the travelling on a rough road (when smaller than the threshold V1). Here, if it is judged that the acceleration signal is generated by the intermediate-speed crash (ⓑ), a signal corresponding to the intermediate-speed crash is fed to each of the first to fourth threshold generating means 47 to 50 in parallel, whereas if it is judged that the acceleration signal is not generated by the intermediate-speed crash at the timing t2 despite that it is higher than the speed level V2 and lower than the level V3 (in other words, it is in the range ③), then it is judged that the acceleration signal is generated due to the travelling on a rough road (ⓒ), so that a signal corresponding thereto is fed to each of the first to fourth threshold generating means 47 to 50 in parallel.

Further, if it is judged that the detected speed is lower than the speed level V1 at the timing t2, then it is also judged that the acceleration signal is generated due to the travelling on a rough road(ⓓ), so that a signal corresponding thereto is fed to each of the first to fourth threshold generating means 47 to 50 in parallel.

Each of the first to fourth threshold generating means 47 to 50 outputs, when receiving a signal indicating the magnitude of the lateral-side crashing from the crash state judging means 46, after receiving a trigger signal from the triggering/resetting signal means 44, one of the threshold modes L1, L2, L3, L4 and L5, whose set level vary in their respective modes on the basis of the signal indicating the magnitude of the crash (hereinafter abbreviated to crash speed).

Figure 4:
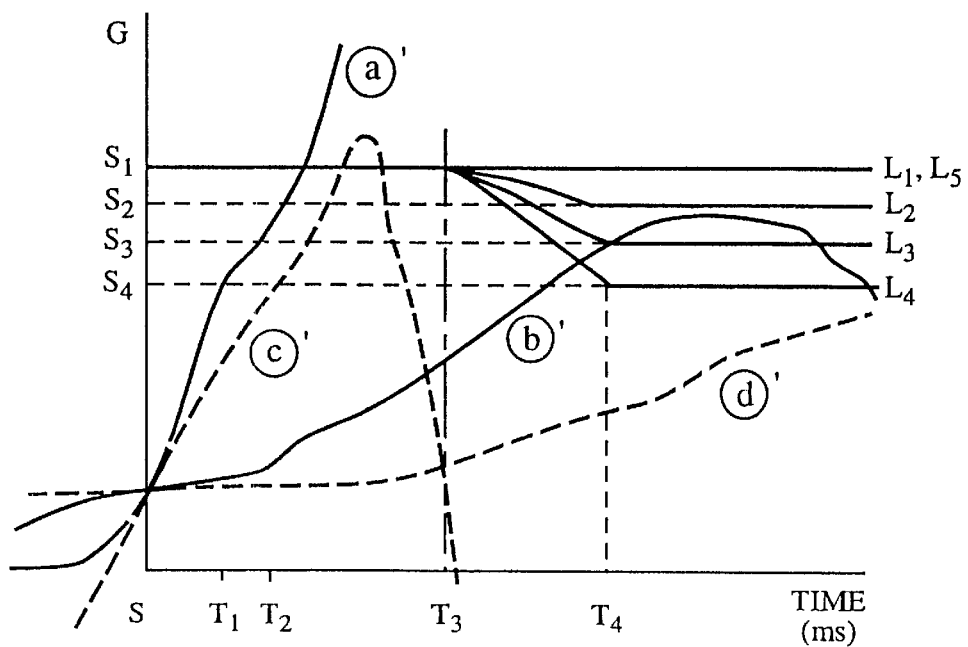
FIG. 4 is an exemplary view for explaining the variation of threshold levels output from the first and third threshold level generating means 47 and 49 shown in FIG. 2 caused in accordance with the time elapse.

For example, as shown in FIG. 3, each of the threshold generating means 47 and 49 outputs a threshold mode L1 when the crash state judging means 46 judges that the speed signal converted from the acceleration signal is within the range between the speed levels 0 and V1 at the timing t2, a threshold mode L2 when the speed signal is within the range between the thresholds V1 and V2, a threshold mode L3 when the speed signal is in the range between the speed levels V2 and V3, a threshold mode L4 when the speed signal is within the range between the speed levels V3 and V4, and outputs a threshold L5 when the speed signal is within the range higher than the speed level V5 (FIGS. 4). On the other hand, each of the threshold generating means 48 and 50 outputs a threshold mode L'1 when the crash state judging means 46 judges that the speed signal is within the range between the speed levels 0 and V1 at the timing t2, a threshold mode L'2 when the speed signal is within the range between the speed levels V1 and V2, a threshold mode L'3 when the speed signal is within the range between the speed levels V2 and V3, a threshold mode L'4 when the speed signal is within the range between the speed levels V3 and V4, and outputs a threshold L'5 if the speed signal is in the range higher than the speed level V5 (FIG. 5).

Figure 5:
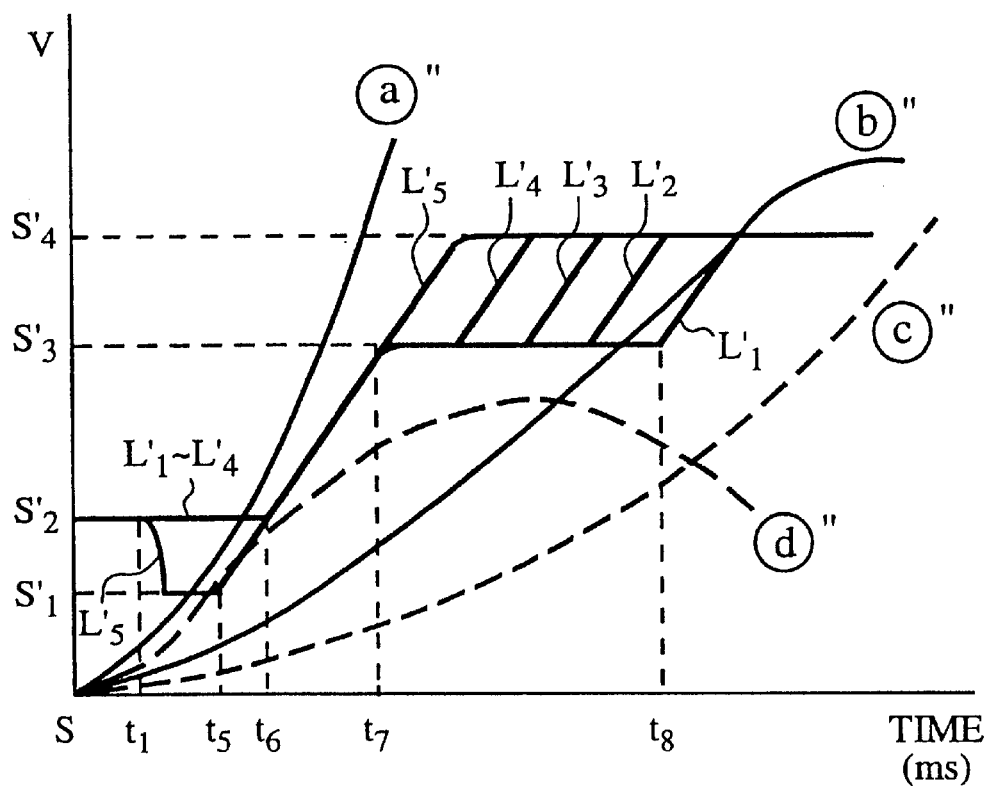
FIG. 5 is an exemplary view for explaining the variation of threshold levels output from the second and fourth threshold level generation means 48 and 50 shown in FIG. 2 caused in accordance with the time elapse.

It should be noted that the variations of acceleration in the respective types of crash are shown for example in FIG. 4; respectively in the case of high-speed crash (ⓐ'), intermediate-speed crash (ⓑ'), and rough-road traveling (ⓒ', ⓓ') whereas variations of speed are shown in FIG. 5; respectively in the case of high-speed crash (ⓐ") intermediate-speed crash (ⓑ"), and rough-road traveling (ⓒ", ⓓ").

Further, either one of the threshold modes L1 to L5 outputted from the first and third threshold generating means 47 and 49 is first set to the threshold level S1 as the initial level by the crash state judging means 46, and kept in the same S1 level if it is judged that the acceleration signal is generated due to the high-speed crash at the timing t1 (FIG. 3), or that the acceleration signal is generated due to the intermediate-speed crash whose speed range is in the level higher than the speed level V4 (FIG. 3) at the timing t2 (FIG. 3), whereas if it is judged that the acceleration signal is generated due to the intermediate-speed crash whose speed range is between the speed levels V1 and V4 at the timing t2, then the initial level S1 is lowered down to respectively to the level S2, S3 and S4, and kept the respective threshold levels at the timing t4 msec. Here, if it is judged that the acceleration signal is generated due to the travelling on a rough road whose speed range is in the level lower than the speed level V1, then the initial threshold level S1 is kept to the end.

On the other hand, either one of the threshold modes L'1 to L'5 output from the second and fourth threshold generating means 48 and 50 is first set to the threshold level S'2 as the initial level by the crash state judging means 46, and kept in the same S'2 level until the timing t5 (FIG. 5) if it is judged that the acceleration signal is generated due to the high-speed crash at the timing t1 (FIG. 3), or that the acceleration signal is generated due to the intermediate-speed crash whose speed range is in the level higher than V4 at the timing t2 (FIG. 3), wherein if it is judged that the acceleration signal is generated due to the high-speed crash, then the threshold mode is gradually lowered to the threshold level S'1 from the timing t1, and kept in the same level S'1 until the timing t5 msec (t2<t5),and thereafter, the threshold level is raised in the linear manner up to the level S'4, and is kept to the end after it reaches the level S'4.

Further, when it is judged that the acceleration signal is generated due to the intermediate-speed crash or due to the travelling on a rough road at the timing t1 as shown in FIG. 3 (in other words, the acceleration signal thereat is lower than V0), the second and fourth threshold generating means 48 and 50 each selects a threshold mode depending on which range of speed the acceleration signal is among the ranges between the speed range 0 and V1, V1 and V2, V2 and V3, and between V3 and V4 at the timing t2 (FIG. 3). For example, if the signal resides within the speed range between 0 and V1 at the timing t2 (shown in FIG. 3), the threshold mode L'1 is selected, and its variation mode is, as shown in FIG. 5, kept in the threshold level S'2 from the timing 0 to timing t6. Then, it is raised in the linear manner towards the level S'3 until it comes to the timing t7, and when it reaches the threshold level S'3, the level is kept until the timing t8, where it is further raised towards the level S'4, and is kept to the end when it reaches the level S'4.

When a threshold mode, in which the set level thereof varies, is determined, the following operation is performed thereafter.

The first comparing means 51 compares the acceleration signal fed from the low-pass filter 43 and the determined one of the thresholds L1 to L5 fed from the first threshold generating means 47, and if it is judged that the acceleration signal exceeds the thus determined thresholds, then it outputs a first preliminary judgment signal.

The second comparing means 52 compares the speed signal fed from the acceleration/speed converting means 45 and the determined one of the thresholds L'1 to L'5 fed from the second threshold generating means 48, and if it is judged that the speed signal exceeds the thus determined threshold, then it outputs a second preliminary judgment signal.

The third comparing means 53 compares acceleration signal fed from the low-pass filter 43 and the determined one of the thresholds L1 to L5 fed from the third threshold generating means 49, and if it is judged that the acceleration signal exceeds the thus determined threshold, then it outputs a third preliminary judgment signal.

The fourth comparing means 54 compares the speed signal fed from the acceleration-to-velocity converting means 45 and the determined one of the thresholds L'1 to L'5 fed from the fourth threshold generating means 50, and if it is judged that the speed signal exceeds the thus determined threshold, then it outputs a fourth preliminary judgment signal.

The first AND gate 55 outputs an ignition signal with respect to the second switching circuit 33 only when the first preliminary judgment signal is fed from the first comparing means 51 and, in addition, the second preliminary judgment signal is fed from the second comparing means 52.

The second AND gate 56 outputs an ignition signal with respect to the first switching circuit 32 only when the third preliminary judgment signal is fed from the third comparing means 53 and, in addition, the fourth preliminary judgment signal is fed from the fourth comparing means 54.

The operational movement based on the above configuration is explained as follows.

An acceleration signal, which is generated by a lateral crashing force exerted to the lateral side of the vehicle and detected by the lateral acceleration sensor 30, is converted to a digital signal by the A/D converter 41, and thereafter an acceleration signal having an improved S/N ratio is extracted by way of the high-pass filter 42 and low-pass filter 43 serially. The acceleration signal extracted thereby is sent to the triggering/resetting means 44, as well as to the acceleration/speed converter 45 where it is converted to a speed signal, and when it exceeds the threshold level set at the triggering/resetting means 44, a trigger signal is fed to the crash state judging means 46. When the crash state judging means 46 receives a speed signal from the acceleration/speed converter 45, it judges as to which of the crash type the generated acceleration signal is among a high-speed crash, an intermediate-speed crash similar to the high-speed crash above, a normal intermediate-speed crash, and travelling on a rough road, by checking the variation of the speed signal in accordance with the time lapse at the two timing points, namely t1 and t2 (the detailed explanation about which is given later).

Then, according to the result of the judgment, the signal 20 output in accordance with the condition on which the acceleration signal is generated is fed to each of the threshold generating means 47 to 49 from the crash state judging means 46, which, in turn, selects one of the thresholds L1 to L5, or of L'1 to L'5, and outputs the thus selected threshold on receiving a trigger signal fed from the triggering/setting means 44.

Thereafter, the first comparing means 51 compares the selected one of the thresholds L1 to L5 generated by the first threshold generating means 47 and an acceleration signal from the low-pass filter 43, and if the acceleration signal exceeds the selected one of the thresholds, it outputs a first crash preliminary signal, whereas the second comparing means 52 compares the selected one of the thresholds L'1 to L'5 generated by the second threshold generating means 48 and a speed signal from the acceleration/speed converter 45, and if the speed signal exceeds the selected one of the thresholds, it outputs a second crash preliminary signal. When these two crash preliminary signals are fed to a first AND gate 55, the second switching circuit 33 is set to on so as to inflate the assistant driver's seat airbag unit.

Further, the third comparing means 53 compares the selected one of the thresholds L1 to L5 generated by the third threshold generating means 49 and an acceleration signal from the low-pass filter 43, and if the acceleration signal exceeds the selected one of the thresholds, it outputs a third crash preliminary signal, whereas the fourth comparing means 54 compares the selected one of the thresholds L'1 to L'5 generated by the fourth threshold generating means 50 and a speed signal from the acceleration/speed converter 45, and if the speed signal exceeds the selected one of the thresholds, it outputs a fourth crash preliminary signal. When these two crash preliminary signals are fed to a second AND gate 56, the first switching circuit 32 is set to on so as to inflate the driver's seat airbag unit.

Next, how the crash judging means 46 classifies the crash state to one of the states; namely a high-speed crash state or an intimidate-speed crash state similar to this high-speed crash, a simple intermediate-speed crash state, and a travelling state on a rough road, is explained below, together with the explanation as to how the threshold mode corresponding to the thus classified crash state is selected.

(In the case of high-speed crash state, or intermediate-speed crash state similar to this state)

The crash state is classified into a high-speed state or an intermediate-speed state when the magnitude of a speed signal fed from the acceleration/speed converter 45 exceeds the speed level V0 at the timing t1, and also exceeds the speed levels V4 at the timing t2.

In this case, each of the first and third threshold generating means 47 and 49 outputs a threshold mode L1 having a predetermined initial level S1, whereas each of the second and fourth threshold generating means 48 and 50 outputs a threshold mode L'5, which varies in such a manner as shown in FIG. 5 that it is first set to a predetermined level S'2 at the timing t0 msec., and thereafter it is lowered gradually to the level S'1 from the timing t'1, which is maintained until the timing t5 and thereafter raised toward the level S'4 in a linear manner so as to be maintained to the end when it comes to this level.

(In the case of intermediate-speed crash state, or rough-road travelling state)

The crash state is classified into an intermediate-speed state, when the magnitude of a speed signal fed from the acceleration/speed converter 45 does not exceed the speed level V0 at the timing t1.

In this case, each of the first and third threshold generating means 47 and 49 first judges as to as to which of the ranges between V1 and V2, V2 and V3, and V3 and V4 the speed signal resides, and outputs a corresponding one of the threshold modes L1, L2 and L3 all having a predetermined initial level S1, wherein the thus selected one of the threshold modes L1, L2 and L3 is lowered to the corresponding level, and maintained at the timing t4 respectively to the level S4, S3 and S2, whereas each of the second and fourth threshold generating means 48 and 50 outputs one of the threshold modes L'2, L'3 and L'4, each of which varies in such a manner as shown in FIG. 5 that it is first set to a predetermined level S'2 at the timing t0 msec, and thereafter it is raised up to the level S'3 from the timing t6 to t7, where it is maintained at the level S'3 for the corresponding time period, and is further shifted to the level S'4.

(In the case of rough road travelling state)

The crash state is classified into a rough road travelling state when the magnitude of a speed signal fed from the acceleration/speed converter 45 does not exceed the speed level V0 at the timing t1, and does not exceed the level V1 either at the timing t2.

In this case, each of the first and third threshold generating means 47 and 49 outputs a threshold mode L1 having a predetermined initial level S1, whereas each of the second and fourth threshold generating means 48 and 50 outputs a threshold mode L'1, which varies in such a manner as shown in FIG. 5 that it is first set to a predetermined level S'2 at the timing t0 msec., and thereafter it is raised up to the level S'3 from the timing t6 to t7, which is maintained until the timing t8 and further shifted to the level S'4.

(Second embodiment)

Figure 6:
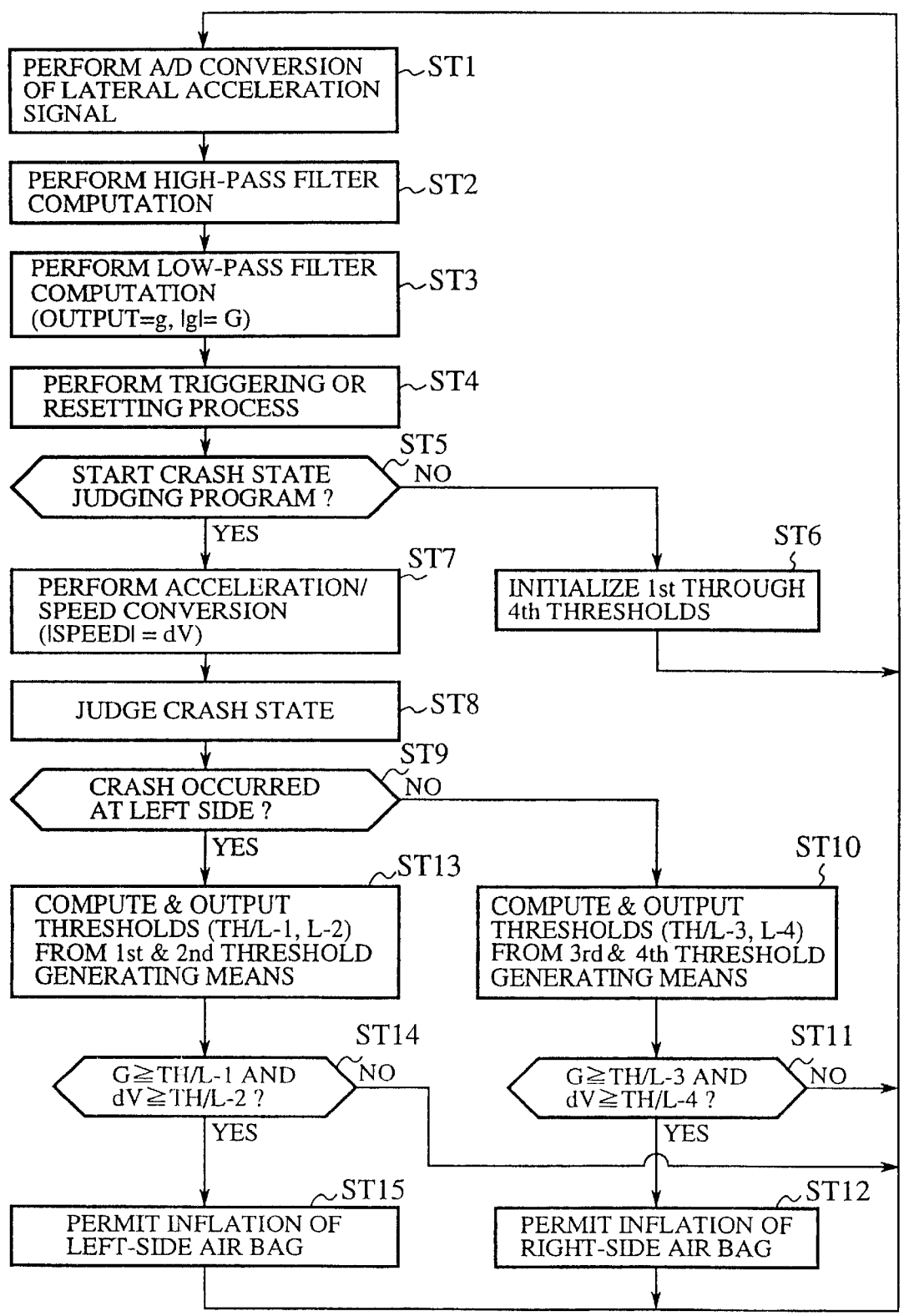
FIG. 6 is a flow chart showing the procedure processed by the microcomputer 31 according to a second embodiment of the present invention.
Figure 7:
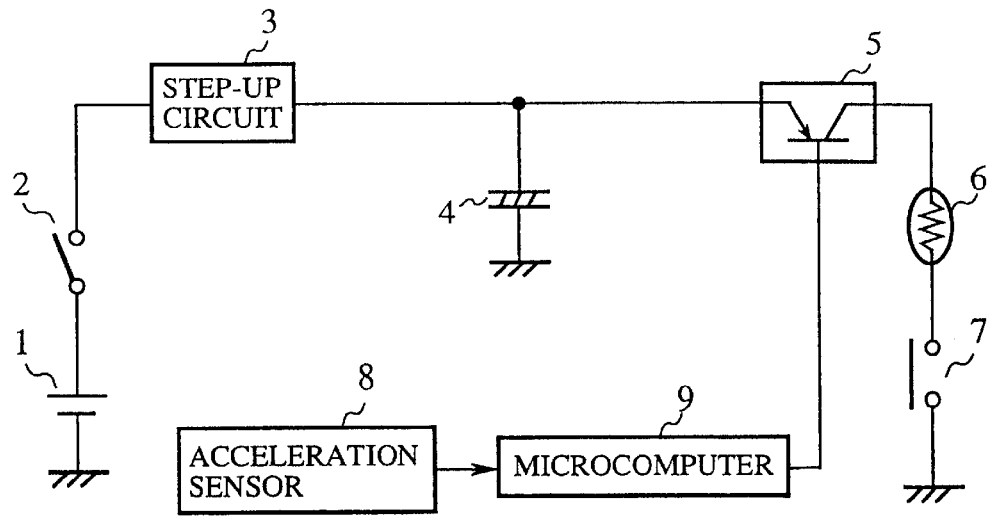
FIG. 7 is a circuit diagram for explaining a configuration of the conventional anti-frontal-crash protective device.

The second embodiment of the present invention is a process performed by a microcomputer 31 contained in the lateral-side airbag unit for both front seats, which is explained in accordance with a flowchart shown in FIG. 6.

In step ST1, the procedure performed in the microcomputer converts an acceleration signal generated in accordance with a crash affecting the lateral direction of the vehicle to a digital signal by the A/D converter, performs a high-pass filter computation in step ST2, and thereafter performs also a low-pass computation in step ST3 thereafter so as to extract an acceleration signal with an improved S/N ratio.

The procedure further performs triggering or resetting operation in step ST4, in order to decide whether to start the program for judging the crash state, and if it decides that the program should not be operated in step ST5, then the procedure advances to step ST6, where the program for generating all the thresholds is reset, and initialized, and returns to step ST1.

In step ST7, the acceleration signal obtained in step ST3 is added to convert the signal to a speed signal, and the procedure advances thereafter to step ST8.

In step ST8, the variation of the magnitude of the signal obtained in step ST7 due to the time lapse is detected at the timings t1 and t2 (t1<t2) in the following manner.

(1) The judgment as to whether a high-speed crash or an intermediate-speed crash similar to the high-speed crash is made when the magnitude of the speed signal obtained in step ST7 exceeds the speed level V0 at the timing t1, or exceeds the maximum value V4 at the timing t2 thereafter.

(2) The judgment as to whether an intermediate-speed crash, or rough road travelling state is made when the magnitude of the speed signal obtained in step ST7 does not exceed the speed level V0, and resides in one of the ranges either between V1 and V2, V2 and V3, or V3 and V4 at the timing t2.

(3) The judgment of a rough road travelling state is made when the magnitude of the speed signal obtained in step ST7 does not exceed neither the speed level V0 at the timing t1, nor the speed level V1 at the timing t2 thereafter.

In step ST9, the direction of the crash; namely at the driver's seat or the assistant's seat is judged depending on whether the speed signal obtained in step ST7 is output in the positive direction or nagative direction, and if it is judged that the crash is detected in the rightward direction; namely at the driver's seat, the procedure advances to step ST10, where one of the threshold modes L1 to L5 and L'1 to L'5 output from the respective third and fourth threshold generating means (hereinafter referred to just as a third threshold and fourth threshold) is selected in accordance with the crash state judged in step ST8 as shown in FIGS. 4 and 5. In step ST11, after judging, on the basis of the thus selected one of the threshold modes L1 to L5 and L'1 to L'5, whether or not the acceleration signal extracted in step ST3 exceeds the third threshold, and the speed signal obtained in step ST7 exceeds the fourth threshold, and if it is judged that the both conditions are not satisfied, the procedure returns to step ST1, whereas if it is judged that the both conditions are satisfied, the procedure advances to step ST12, and sets the first switching circuit 32 to on so as to inflate the driver's seat airbag unit.

On the other hands, if it is judged that the crash is detected in the leftward direction; namely at the assistant driver's seat, the procedure advances to step ST13, where one of the threshold modes output from the respective first and second threshold generating means (hereinafter referred to just as a first threshold and second threshold) is selected in accordance with the crash state judged in step ST8 as shown in FIGS. 4 and 5. In step ST14, after judging, on the basis of the thus selected one of the thresholds, whether or not the acceleration signal extracted in step ST3 exceeds the first threshold, and the speed signal obtained in step ST7 exceeds the second threshold, and if it is judged that the both conditions are not satisfied, the procedure returns to step ST1, whereas if it is judged that the both conditions are satisfied, the procedure advances to step ST15, and sets the second switching circuit 33 to on so as to inflate the driver's seat airbag unit.

As explained heretofore, according to the present invention, an airbag unit is provided in which an acceleration sensor for detecting acceleration caused by the laterally applied crash force is commonly used, yet obtaining a high detection accuracy.

Further, the above effect that the threshold is varied on the basis of the speed variation at the occurrence of a crash accident is not limited only to the lateral-side crashing as mentioned above, but it can be applied also for judging the crash state at the occurrence of a frontal crashing accident.

What is claimed is:

1. An airbag unit provided in a vehicle, comprising:
   an acceleration sensor for detecting an acceleration applied to said vehicle as a result of a collision, and generating an acceleration signal corresponding to the detected acceleration;
   an acceleration-to-speed converting means for inputting said acceleration signal fed from said acceleration sensor and converting it to a speed signal;
   a crash state judging means for determining the type of collision based on the value of the speed signal fed from said acceleration-to-speed converting means and producing a crash state judging signal indicative of the judged type of collision;
   first and second threshold generating means each for selecting and outputting a threshold on the basis of said crash state judging signal;
   a first comparing means for comparing the threshold from said first threshold generating means and said acceleration signal fed from said acceleration sensor, and outputting a first crash signal when said acceleration signal exceeds said threshold;
   a second comparing means for comparing the threshold from said second threshold generating means and said speed signal fed from said acceleration-to-speed converting means, and outputting a second crash signal when said speed signal exceeds said threshold from said second threshold generating means; and
   an activation control means for comparing the first crash signal from said first comparing means and the second crash signal from said second comparing means, and outputting an inflation signal for inflation of an airbag provided in said vehicle in response to a predetermined result of said comparison.

2. An airbag unit as claimed in claim 1, wherein said crash state judging means determines the type of collision on the basis of the magnitude of the speed signal fed from said acceleration-to-speed converting means at a predetermined time after the speed signal is generated.

3. An airbag unit as claimed in claim 2, wherein said crash state judging means determines the type of collision on the basis of the magnitude of the speed signal fed from said acceleration-to-speed converting means at predetermined first and second times after the speed signal is generated.

4. An airbag unit as claimed in claim 3, wherein said crash state judging means determines the occurrence of a high-speed collision on the basis of the magnitude of the speed signal at said first time, and also determines the occurrence of an intermediate-speed collision and a rough road travelling state on the basis of the magnitude of the speed signal at said second time.

5. An airbag unit as claimed in claim 1, wherein said first threshold generating means is set to a mode in which the threshold output therefrom is lowered as a function of the output from said crash state judging means at a predetermined time after the output of said threshold.

6. An airbag unit as claimed in claim 1, wherein said second threshold generating means is set to a mode in which the threshold output therefrom is lowered as a function of the output from said crash state judging means during the time period beginning from a predetermined time after the output of said threshold.

7. An airbag unit as claimed in claim 1, wherein said second threshold generating means is set to a mode in which the threshold output therefrom is maintained at the same level for a predetermined time period after the output of said threshold, and raised thereafter as a function of the output from said crash state judging means.

8. An airbag unit as claimed in claim 1, wherein said acceleration sensor is mounted to a vehicle chassis under the center console of the vehicle.

9. A method of inflating an airbag by use of an airbag unit for protecting people in a vehicle from a lateral collision exerted to the vehicle, said method comprising the steps of:

inputting an acceleration signal from an acceleration sensor for detecting an acceleration applied to a vehicle as a result of said collision, and converting the acceleration signal fed from said acceleration sensor to a speed signal by an acceleration-to-speed converter;

determining the type of collision based on the value of the converted speed signal by a crash state judging circuit;

outputting said determined collision type to respective first to fourth threshold generating means for generating respective first to fourth thresholds based on said determined collision type;

wherein when said speed signal has one of a positive or negative value,
comparing the threshold from said first threshold generating means and said acceleration signal fed from said acceleration sensor by use of a first comparing means, and outputting a first crash signal when said acceleration signal exceeds said threshold;
comparing the threshold from said second threshold generating means and said speed signal fed from said acceleration-to-speed converting means by use of a second comparing means, and outputting a second crash signal when said speed signal exceeds said threshold; and outputting an inflation signal for inflating an airbag when said first crash signal from said first comparing means and said second crash signal from said second comparing means are both output, and wherein when said speed signal has the other one of a positive or negative value,
comparing the threshold from said third threshold generating means and said acceleration signal fed from said acceleration sensor by use of a third comparing means, and outputting a third crash signal when said acceleration signal exceeds said threshold;
comparing the threshold from said fourth threshold generating means and said speed signal fed from said acceleration-to-speed converting means by use of a fourth comparing means, and outputting a fourth crash signal when said speed signal exceeds said threshold; and
outputting an inflation signal for inflating an airbag when said third crash signal from said third comparing means and a said fourth crash signal from said fourth comparing means are both output.

10. A method of inflating an airbag by use of an airbag unit as claimed in claim 9, wherein said crash state judging means determines the type of collision based on the value of the speed signal fed from said acceleration-to-speed converting means at a predetermined time after the speed signal is generated.

11. A method of inflating an airbag by use of an airbag unit as claimed in claim 10, wherein said crash state judging means determines the type of collision based on the value of the speed signal fed from said acceleration-to-speed converting means at predetermined first and second times after the speed signal is generated.

12. A method of inflating an airbag by use of an airbag unit as claimed in claim 11, wherein said crash state judging means determines whether a high-speed collision has occurred based on the value of the speed signal at said first time, and also determines whether an intermediate-speed collision has occurred or whether a rough road travelling state exists based on the value of the speed signal at said second timing.

13. An airbag actuation circuit for actuating a particular airbag in a vehicle in accordance with a direction of collision of said vehicle, comprising:

first and second airbags, respectively mounted at left and right sides of said vehicle;

a lateral acceleration sensor for detecting an acceleration and a direction of said acceleration applied to said vehicle as a result of a collision, and producing an acceleration signal having a magnitude corresponding to the magnitude of said acceleration, and a positive or negative value corresponding to the direction of the acceleration; and means responsive to said acceleration signal for actuating either said first airbag or said second airbag as a function of the positive or negative value of said acceleration signal.

* * * * *